(12) United States Patent
Zhang et al.

(10) Patent No.: US 11,463,631 B2
(45) Date of Patent: Oct. 4, 2022

(54) METHOD AND APPARATUS FOR GENERATING FACE IMAGE

(71) Applicant: BEIJING BAIDU NETCOM SCIENCE AND TECHNOLOGY CO., LTD., Beijing (CN)

(72) Inventors: Henan Zhang, Beijing (CN); Xin Li, Beijing (CN); Fu Li, Beijing (CN); Tianwei Lin, Beijing (CN); Hao Sun, Beijing (CN); Shilei Wen, Beijing (CN); Hongwu Zhang, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 78 days.

(21) Appl. No.: 17/025,255

(22) Filed: Sep. 18, 2020

(65) Prior Publication Data
US 2021/0227152 A1    Jul. 22, 2021

(30) Foreign Application Priority Data
Jan. 20, 2020  (CN) .......................... 202010065590.1

(51) Int. Cl.
  *H04N 5/262*  (2006.01)
  *H04N 5/232*  (2006.01)
  (Continued)

(52) U.S. Cl.
  CPC ........... *H04N 5/2621* (2013.01); *G06T 5/002* (2013.01); *G06V 40/166* (2022.01);
  (Continued)

(58) Field of Classification Search
  CPC ............. H04N 5/2621; H04N 5/23222; H04N 5/232933; G06T 5/002; G06T 2207/10024;
  (Continued)

(56) References Cited

U.S. PATENT DOCUMENTS

| 10,552,977 B1* | 2/2020 | Theis ..................... G06T 11/001 |
| 2009/0079844 A1* | 3/2009 | Suzuki ............... H04N 5/23218 348/222.1 |

(Continued)

FOREIGN PATENT DOCUMENTS

| CN | 110706303 | 1/2020 |
| JP | 2019-148980 | 9/2018 |

(Continued)

OTHER PUBLICATIONS

Wu, et al., Landmark Assisted CycleGAN for Cartoon Face Generation, arXiv:1907.01424v1 [cs.CV] Jul. 2, 2019.
Notification of Reason for Refusal dated Mar. 10, 2022 in Korean Application No. 10-2020-0123809.
Notice of Allowance issued in Japanese Application No. 2020-157447 dated May 13, 2022.

*Primary Examiner* — Gevell V Selby
(74) *Attorney, Agent, or Firm* — Knobbe Martens Olson & Bear LLP

(57) ABSTRACT

Embodiments of the present disclosure provide a method and apparatus for generating an image. The method may include: receiving a first image including a face input by a user in an interactive scene; presenting the first image to the user; inputting the first image into a pre-trained generative adversarial network in a backend to obtain a second image output by the generative adversarial network; where the generative adversarial network uses face attribute information generated based on the input image as a constraint; and presenting the second image to the user in response to obtaining the second image output by the generative adversarial network in the backend.

20 Claims, 5 Drawing Sheets

(51) Int. Cl.
 G06T 5/00 (2006.01)
 G06V 40/16 (2022.01)
(52) U.S. Cl.
 CPC ... H04N 5/23222 (2013.01); H04N 5/232933 (2018.08); *G06T 2207/10024* (2013.01); *G06T 2207/20081* (2013.01); *G06T 2207/20084* (2013.01)
(58) Field of Classification Search
 CPC . G06T 2207/20081; G06T 2207/20084; G06T 11/00; G06T 3/0012; G06T 1/0007; G06T 13/40; G06T 2207/20182; G06T 2207/30201; G06V 40/166; G06V 10/82; G06V 40/161; G06V 40/16; G06K 9/6268; G06N 3/0454; G06N 3/08; H04L 51/30
 See application file for complete search history.

(56) References Cited

U.S. PATENT DOCUMENTS

| | | | |
|---|---|---|---|
| 2018/0285629 A1* | 10/2018 | Son | G06V 40/171 |
| 2020/0104574 A1* | 4/2020 | Han | G06V 10/82 |
| 2021/0019541 A1* | 1/2021 | Wang | G06V 10/82 |
| 2021/0149274 A1* | 5/2021 | Kang | H04N 5/232125 |

FOREIGN PATENT DOCUMENTS

| | | |
|---|---|---|
| JP | 2019-014898 | 1/2019 |
| JP | 2019-079505 | 5/2019 |
| JP | 2020-003906 | 1/2020 |

\* cited by examiner

METHOD AND APPARATUS FOR GENERATING FACE IMAGE

CROSS-REFERENCE TO RELATED APPLICATIONS

This application claims priority to Chinese Patent Application No. 202010065590.1, filed on Jan. 20, 2020, titled "Method and apparatus for generating image," which is hereby incorporated by reference in its entirety.

TECHNICAL FIELD

The present disclosure relates to the field of computer technology, in particular, to the field of image conversion technology, and more particularly, to a method and apparatus for generating an image.

BACKGROUND

At present, there are many digital entertainment products in the market, in which a self-taking special effect playing method, such as converting a face into a face of a child, changing a style of a face, has great interest and is loved by people.

Currently, most applications provide a service of generating faces of different styles by using face templates, that is, selecting materials in a material database of different styles that are most similar to the five sense organs and facial forms of the identified users according to the five sense organs and facial forms of the identified users, and assembling the materials so that the faces are subjected to two-dimensional conversion to obtain faces of different styles.

SUMMARY

Embodiments of the present disclosure provide a method and apparatus for generating an image.

In a first aspect, an embodiment of the present disclosure provides a method for generating an image, including: receiving a first image including a face input by a user; presenting the first image to the user; inputting the first image into a pre-trained generative adversarial network in a backend to obtain a second image output by the generative adversarial network; wherein the generative adversarial network uses face attribute information generated based on the input image as a constraint; and presenting the second image to the user in response to obtaining the second image output by the generative adversarial network in the backend.

In some embodiments, before receiving the first image including the face input by the user, the method further includes: receiving an instruction of converting a face in an interactive scene; and presenting information of inputting the face image to the user.

In some embodiments, presenting information of inputting the face image to the user includes: presenting a face automatic photographing interface to the user; and the receiving the first image including the face input by the user comprises: triggering an automatic photographing function to obtain the first image in response to detecting that the user inputs the face in an automatic photographing interface.

In some embodiments, the presenting the face automatic photographing interface to the user includes at least one of: presenting an automatic photographing interface having a frame of a preset style and/or photographing requirements to the user; or presenting prompt information of failure to detect the face to the user in response to failing to detect the face at the photographing interface.

In some embodiments, the presenting the face automatic photographing interface to the user further includes: presenting an automatic photographing countdown to the user in response to detecting the face at the automatic photographing interface; photographing the detected face in response to the end of the automatic photographing countdown; and ending the countdown and presenting prompt information indicating that the face is not recognized to the user in response to the user not inputting the face within an automatic photographing countdown period.

In some embodiments, the presenting the first image to the user includes: after presenting the first image to the user for a preset time length, providing a masking layer on the presented first image and displaying face conversion progress prompt information in an interactive scene.

In some embodiments, the frame of the preset style is the same as or similar to a design style of the face conversion progress prompt information.

In some embodiments, the inputting the first image into the pre-trained generative adversarial network includes: subjecting the first image to different degrees of Gaussian blurring, and inputting the different degrees of Gaussian blurred first image into a pre-trained generative adversarial network; or detecting whether a texture feature parameter value of the first image is greater than a texture threshold, subjecting the first image to different degrees of Gaussian blurring in response to the texture feature parameter value of the first image being greater than the texture threshold, and inputting the different degrees of Gaussian blurred first image into the pre-trained generative adversarial network.

In some embodiments, the generative adversarial network using face attribute information generated based on the input image as the constraint including: using, by the generative adversarial network, multi-channel face image generated based on the input image as an input; wherein the multi-channel face image comprises an RGB three-channel image of the input image and at least one of following images of the input image: one of the following two images of key points of the face: a binary image of one-channel or an RGB three-channel image; one of the following two images of a face semantic segmentation result: a binary image of one-channel or an RGB three-channel image; or a binary image of hair.

In some embodiments, the method further includes: presenting the first image and the second image to the user simultaneously after presenting the second image to the user for a predetermined time length.

In some embodiments, the method further includes: presenting a face style conversion option to the user; receiving a selection of the user for the conversion option; presenting a conversion process image to the user; and presenting a new second image to the user in response to generating the new second image in a different style from the second image before a conversion in the backend.

In some embodiments, the presenting the face style conversion option to the user includes: presenting an image of a dice button and an image of a dynamically clicked hand to the user; the receiving the selection of the user for the conversion option comprises: receiving a user click of the dice button; and the presenting the conversion process image to the user comprises: presenting a dynamic dice image to the user.

In some embodiments, presenting the new second image to the user includes: presenting the new second image to the user with a downward erasing special effect.

In some embodiments, the method further includes: returning to presenting the information of inputting face image to the user in response to not receiving a selection operation on a saving option or a conversion option by the user within a predetermined time length after presenting the conversion option.

In some embodiments, the inputting the first image into the pre-trained generative adversarial network in the backend to obtain the second image output by the generative adversarial network includes: inputting the first image into the pre-trained generative adversarial network located at a cloud server in the backend to obtain the second image output by the generative adversarial network output; and the method further comprises: in response to detecting a network abnormality when inputting the first image to the pre-trained generative adversarial network located at the cloud server in the backend, presenting information indicating the network abnormality and requesting retry to the user, and returning to presenting information of inputting input the face image to the user after presenting the information indicating the network abnormality and requesting retry for a preset duration.

In some embodiments, the method further includes at least one of: in response to inputting the first image into the pre-trained generative adversarial network in the backend to obtain the second image output by the generative adversarial network for a time length exceeding a preset time length, presenting to the user information indicating failure of generating and retry being requested, and when a time length of presenting to the user information indicating failure of generating and retry being requested meets a set time length, returning to presenting the information of inputting the face image to the user; in response to an abnormality occurring in a process of inputting the first image into the pre-trained generative adversarial network in the backend to obtain the second image output by the generative adversarial network, presenting information indicating failure of generating and retry being requested to the user, and returning to presenting the information of inputting the face image to the user when a duration of presenting the information indicating failure of generating and retry being requested to the user meets a set duration; or in response to the user switching to another application and returning from the another application, returning to presenting the information of inputting the face image to the user.

In a second aspect, an embodiment of the disclosure provides an apparatus for generating a face image, including: a first image input unit configured to receive a first image including a face input by a user; a first image presenting unit configured to present the first image to the user; a second image output unit configured to input the first image into a pre-trained generative adversarial network in the backend to obtain a second image output by the generative adversarial network; wherein the generative adversarial network uses face attribute information generated based on the input image as a constraint; and a second image presenting unit configured to present the second image to the user in response to obtaining the second image output by the generative adversarial network in the backend.

In some embodiments, the first image presenting unit is further configured to: after presenting the first image to the user for a preset time length, provide a masking layer on the presented first image and display face change progress prompt information in an interactive scene.

In some embodiments, the second image output unit is further configured to: subject the first image to different degrees of Gaussian blurring, and input the different degrees of Gaussian blurred first image into a pre-trained generative adversarial network; or detect whether a texture feature parameter value of the first image is greater than a texture threshold, subject the first image to different degrees of Gaussian blurring in response to the texture feature parameter value of the first image being greater than the texture threshold, and input the different degrees of Gaussian blurred first image into the pre-trained generative adversarial network.

In some embodiments, the generative adversarial network employed in the second image output unit using face attribute information generated based on the input image as a constraint, comprising: using, by the generative adversarial network, multi-channel face image generated based on the input image as an input; wherein the multi-channel face image comprises an RGB three-channel image of the input image and at least one of following images of the input image: one of the following two images of key points of the face: a binary image of one-channel or an RGB three-channel image; one of the following two images of a face semantic segmentation result: a binary image of one-channel or an RGB three-channel image; or a binary image of hair.

In some embodiments, the apparatus further includes: a conversion option presenting unit configured to present a face style conversion option to the user; a user selection receiving unit configured to receive a selection of the user for the conversion option; a process image presenting unit configured to present a conversion process image to the user; and a second image updating unit configured to present a new second image to the user in response to generating the new second image in a different style from the second image before a conversion in the backend.

In some embodiments, the conversion option presenting unit is further configured to: present an image of a dice button and an image of a dynamic clicked hand to the user; the user selection receiving unit is further configured to receive a user click on the dice button; and the process image presenting unit is further configured to present a dynamic dice image to the user.

In some embodiments, the second image updating unit is further configured to: present the new second image to the user with a downward erasing special effect.

In some embodiments, the apparatus further includes: an information presentation returning unit configured to: return to presenting the information of inputting face image to the user in response to not receiving a selection operation on a saving option or a conversion option by the user within a predetermined time length after presenting the conversion option.

In a third aspect, an embodiment of the present disclosure provides an electronic device/terminal/server, including: one or more processors; and a storage apparatus for storing one or more programs; wherein the one or more programs, when executed by the one or more processors, cause the one or more processors to implement the method for generating an image as described above.

The method and apparatus for generating an image according to embodiments of the present disclosure first receiving a first image including a face input by a user; then, presenting the first image to the user; thereafter, inputting the first image into a pre-trained generative adversarial network in a backend to obtain a second image output by the generative adversarial network; where the generative adversarial network uses face attribute information generated based on the input image as a constraint; and; and finally, presenting the second image to the user in response to obtaining the second image output by the generative adversarial network in the backend. In this process, since the face attribute information is used as the constraint of the generative adversarial network, the accuracy and efficiency of the generative adversarial network to generate the second image based on the input first image can be improved, and the probability of erroneous generation of the image is reduced, so that the generated second image is more targeted.

BRIEF DESCRIPTION OF THE DRAWINGS

Other features, objects, and advantages of the present disclosure will become more apparent upon reading the following detailed description of non-limiting embodiments with reference to the accompanying drawings.

DETAILED DESCRIPTION

Figure 1:
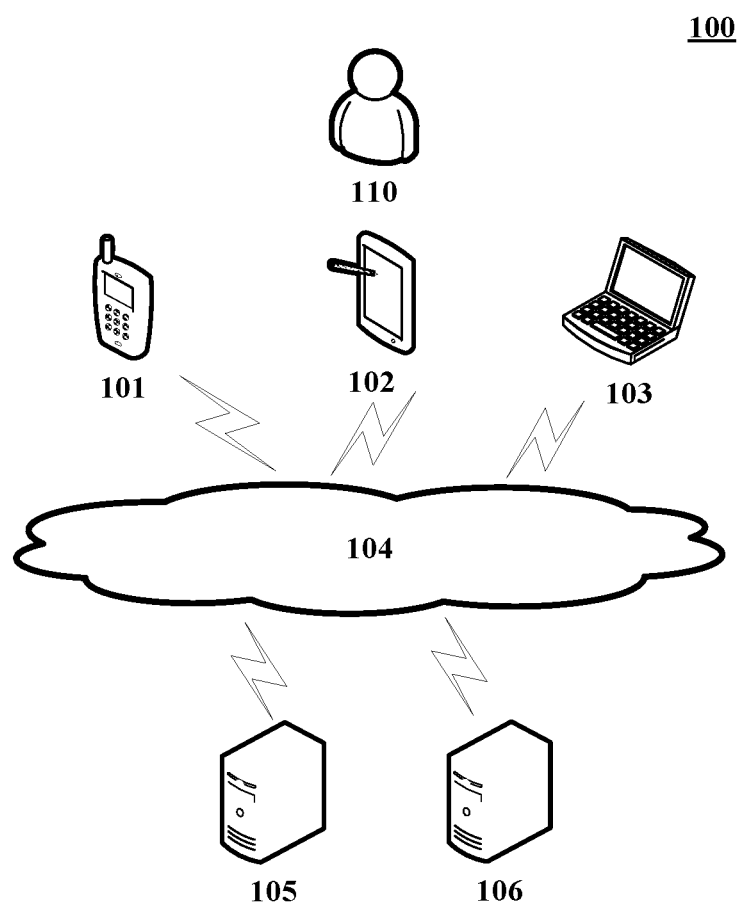
FIG. 1 is an example system architecture diagram in which some embodiments of the present disclosure may be applied.

The present disclosure is described in further detail below with reference to the accompanying drawings and embodiments. It is to be understood that the specific embodiments described herein are merely illustrative of the related disclosure and are not restrictive of the disclosure. It is also to be noted that, for ease of description, only parts related to the disclosure are shown in the drawings.

It is noted that embodiments in the present disclosure and features in the embodiments may be combined with each other without conflict. The present disclosure will now be described in detail with reference to the accompanying drawings and embodiments. It will also be appreciated by those skilled in the art that although the terms "first", "second", or the like may be used herein to describe images, these images should not be limited by these terms. These terms are used only to distinguish one image from other images.

FIG. 1 illustrates an example system architecture 100 in which a method for generating an image or an apparatus for generating an image of some embodiments of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired, wireless communication links, or fiber optic cables, among others.

The user may interact with the server 105 through the network 104 using the terminal devices 101, 102, 103 to receive or send messages, etc. Various communication client applications, such as short video applications, browser applications, shopping applications, search applications, instant messaging tools, mailbox clients, social platform software, and the like, may be installed on the terminal devices 101, 102, 103.

The terminal devices 101, 102, 103 may be hardware or software. When the terminal devices 101, 102, 103 are hardware, they may be various electronic devices supporting browser applications, including but not limited to a tablet computer, a laptop computer, a desktop computer, and the like. When the terminal devices 101, 102, and 103 are software, they may be installed in the electronic devices listed above, and may be implemented, for example, as a plurality of pieces of software or software modules for providing distributed services, or as a single piece of software or software module, which is is not specifically limited herein.

The server 105 may be a server providing various services, such as a background server providing support to the terminal devices 101, 102, 103. The background server may perform processing such as analysis on received data such as a request, and feed back a processing result to the terminal device.

It should be noted that the server may be hardware or software. When the server is hardware, it may be implemented as a distributed server cluster composed of multiple servers may be implemented, or a single server. When the server is software, it may be implemented, for example, as a plurality of pieces of software or software modules for providing distributed services, or it may be implemented as a single piece of software or software module, which is not specifically limited herein.

In practice, the method for generating an image provided by embodiments of the present disclosure may be performed by the terminal devices 101, 102, 103 and/or the servers 105, 106, and the apparatus for generating an image may also be provided in the terminal devices 101, 102, 103 and/or the servers 105, 106.

It should be understood that the number of terminal devices, networks and servers in FIG. 1 is merely illustrative. There may be any number of terminal devices, networks, and servers as desired for implementation.

Figure 2:
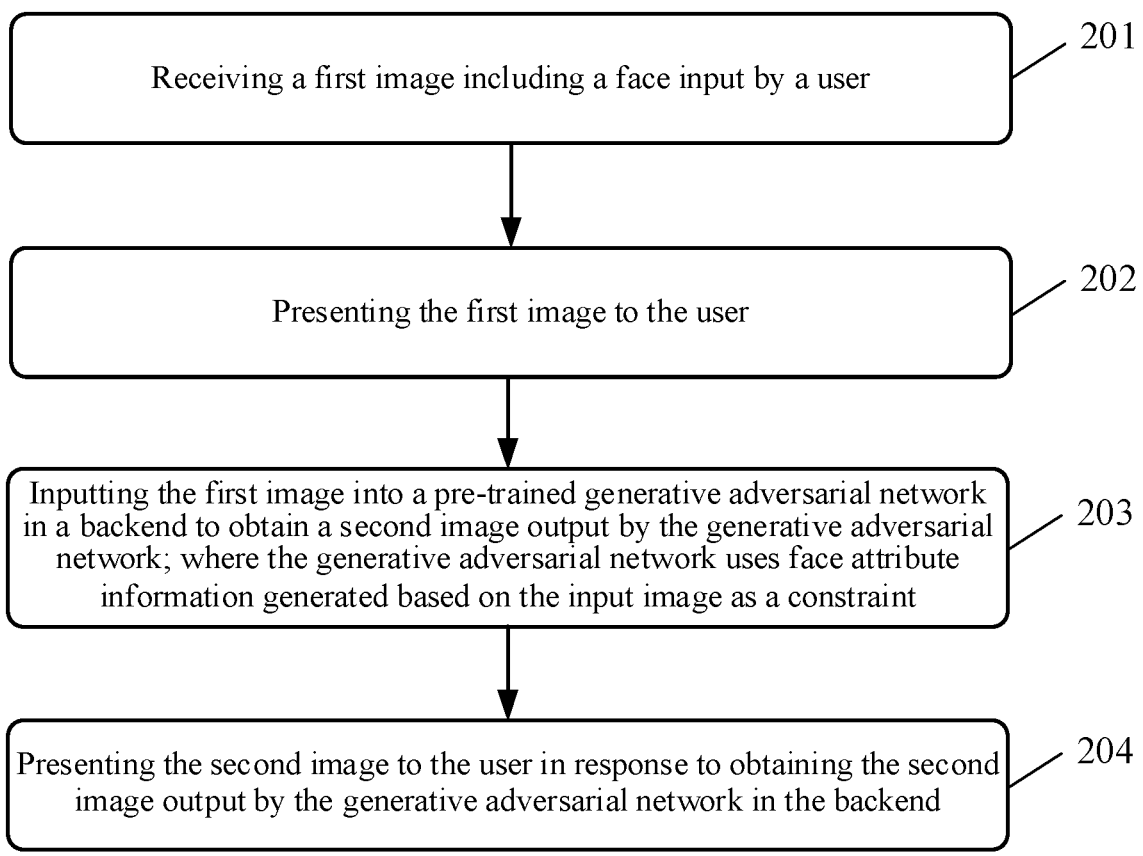
FIG. 2 is a flow diagram of a method for generating an image according to an embodiment of the present disclosure.

With continuing reference to FIG. 2, FIG. 2 illustrates a flow 200 of a method for generating an image according to an embodiment of present disclosure. The method for generating an image includes the following steps.

In step 201, a first image including a face input by a user is received.

In the present embodiment, an executing body of a method for generating an image (such as a terminal or a server shown in FIG. 1) may acquire a first image including a face input by a user from a local or remote album or a database in an interactive scene, or may acquire the first image including a face via a local or remote photographing service.

In some alternative implementations of the present embodiment, prior to receiving the first image including the face input by the user, the method for generating a face image further includes receiving an instruction of converting a face in an interactive scene; and presenting information of inputting a face image to a user.

In the present implementation, the instruction of converting a face received by the executing body may be an instruction of converting a face input by a user, for example, selection of an option of the face change by the user; or may be an instruction of converting a face triggered by the presence of the user, for example, when the executing body provides a face change service mode, if a face of the user is detected, it is considered that the instruction of converting a face is received.

The executing body may present the information of the inputting face image to the user after receiving the instruction of changing a face. For example, the user is presented with information prompting the user to input a face image from a local or cloud album or a database, or the user is presented with information invoking a local or remote photographing service to input a face image.

In a specific example, presenting information of inputting a face image to a user may include: presenting a face automatic photographing interface to the user; and receiving the first image including a face input by the user includes: triggering an automatic photographing function to obtain a first image in response to detecting that the user inputs the face at the automatic photographing interface. As a result, the first image may be quickly acquired according to an instruction of converting a face received by the executing body. Further, when the automatic photographing function is triggered, the acousto-optic effect of the flash lamp may also be presented to the user, thereby improving the attention of the user and improving the efficiency of the automatic photographing.

When presenting a face automatic photographing interface to a user, the executing body may present a frame with a preset style and/or an automatic photographing interface required for photographing to the user, thereby improving interestingness and/or human-computer interaction efficiency of photographing. Alternatively or additionally, the executing body may present the prompt information of failure to detect a face to the user in response to failing to detect a face at the photographing interface, thereby reminding the user to input the face, so as to improving the efficiency of human-computer interaction.

In some alternative implementations of the present embodiment, presenting a face automatic photographing interface to the user further includes: presenting an automatic photographing countdown to the user in response to detecting a face at the photographing interface; photographing the detected face at the end of the automatic photographing countdown period in response to the user continuously inputting the face within an automatic photographing countdown period; and presenting prompt information indicating that the face is not recognized to the user when the countdown is ended in response to the user not inputting the face in the automatic photographing countdown period.

In the present implementation, the executing body may present an automatic photographing countdown to the user after detecting a face at the photographing interface. If the user continuously inputs the face in the automatic photographing countdown period, that is, the executing body detects the face in the automatic photographing countdown period, the executing body may photograph the detected face at the end of the automatic photographing countdown period. If the user does not input the face in the automatic photographing countdown period, that is, the executing body does not detect the face in the automatic photographing countdown period, the executing body ends the countdown and presents the user with the prompt information indicating that the face is not recognized.

The method of presenting a face automatic photographing interface to the user in this implementation mode may monitor the presence of a face within the time length of automatic photographing countdown. If the face of the user always exists, the user is photographed at the end of the automatic photographing countdown, and the user is reminded in time when the face is not detected, thereby improving the efficiency of automatically photographing the face.

In step 202, a first image is presented to the user.

In the present embodiment, the executing body of the method for generating an image may present the first image to the user in a presentation manner in the prior art or in the future development technology, which is not limited in the present disclosure. For example, the executing body may present the first image to the user on a display screen, or present the first image to the user using conventional projection techniques or holographic projection techniques.

In some alternative implementations of the present embodiment, presenting the first image to the user may include: after presenting the first image to the user for a preset time length, providing a masking layer on the presented first image and displaying face conversion progress prompt information in an interactive scene.

In the present implementation, after presenting the first image to the user for a preset time length (for example, 3 seconds), the masking layer may be provided on the presented first image, and the face conversion progress prompt information is displayed in the interactive scene, so that the user is reminded that the face change is being performed on the first image, so that the user can visually see the face conversion progress, thereby improving the human-computer interaction efficiency.

In some alternative implementations of the present embodiment, the frame of the preset style is the same as or similar to the design style of the face conversion progress prompt information.

In the present implementation, by setting the frame of the preset style to be the same as or similar to the design style of the face progress prompt information, the user can be presented with a consistent look and feel, thereby improving the user acceptance. Here, the design style is similar, meaning that a similarity of the design style is greater than a preset similarity threshold, or the design style is an adjacent style in a preset style sorting list.

In step 203, the first image is input to a pre-trained generative adversarial network in the backend to obtain a second image output from the generative adversarial network.

In the present embodiment, the executing body may input a first image into a pre-trained generative adversarial network in the backend to obtain a second image output from the generative adversarial network; Where the generative adversarial network uses the face attribute information generated based on the input image as a constraint.

The pre-trained generative adversarial network refers to a deep learning model developed on the basis of GANs (Generative Adversarial Networks). For example, the generative adversarial network (GAN), the cyclic consistently generative adversarial network CycleGan, the face high-precision attribute editing model AttGAN, the star generative adversarial network StarGAN, the space transformer generative adversarial network STGAN, the dual learning generative adversarial networks DualGAN, DiscoGAN, and the like.

The pre-trained generative adversarial network generally includes a generator G (generator) and a Discriminator D. There are two data fields X, Y, respectively. G is responsible for imitating the data in the X domain into real data and hiding them in the real data, while D is responsible for separating the forged data from the real data. After the game between G and D, the forgery technology of G becomes more and more serious, and the authentication technology of D becomes more and more serious. Until D can no longer distinguish whether the data is real or G-generated data, the process of confrontation reaches a dynamic balance.

Training the generative adversarial network requires two loss functions: a reconstruction loss function of the generator and a discrimination loss function of the discriminator. Where the reconstruction loss function is used to determine whether the generated picture is as similar as possible to the original picture; the discrimination loss function is used to input the generated false picture and the original true picture into the discriminator to obtain the loss of the binary classification of 0 and 1.

The generator is composed of an encoder, a converter, and a decoder. The encoder extracts features from the input image using a convolutional neural network. For example, the image is compressed into 256 feature vectors of 64*64. The converter converts the feature vectors of the image in the DA domain into the feature vectors in the DB domain by combining the non-similar features of the image. For example, six layers of Reset modules may be used, each Reset module is a neural network layer composed of two convolutional layers, so as to achieve the goal of retaining the original image features at the time of conversion. The decoder performs the task of restoring the low-level features from the feature vectors by using the deconvolution layer, and finally obtains the generated image.

The discriminator takes an image as input and attempts to predict whether the image is the original image or the output image of the generator. The discriminator itself belongs to a convolutional network and needs to extract features from an image, and then determines whether the extracted features belong to a specific category by adding a convolutional layer that generates a one-dimensional output.

Here, the pre-trained generative adversarial network generates face attribute information based on the input image as a constraint. The face attribute information here is a series of biometric information that characterizes a face feature, has strong stability and individual differences, and identifies a person's identity. The face attribute information may include gender, skin color, age, expression, and the like.

When face attribute information generated based on an input image (for example, a first image inputted when applying the generative adversarial network or a first image sample inputted when training the generative adversarial network) is used as a constraint, a method for a constraint of a machine learning network in the prior art or in a future development technology may be used, and this is not limited in the present disclosure.

In a specific example of the present disclosure, the face attribute information generated based on the input image may be used as an input of any one or more layers of the generator network in the generative adversarial network in combination with the original input of the layer network as an input, thereby improving the relevance of the output image of the generator network introduced with constraint to the face attribute information in machine learning.

In another specific example of the present disclosure, the face attribute information generated based on the input image uses the face marker feature to define a consistency loss, instructing the training of the discriminator in the generative adversarial network. First, the generator generates a coarse second image based on the input first image. Then, the generative adversarial network generates a pre-training regressor to predict the facial landmark according to the generated second image, and marks key points of the face. Finally, the facial features corresponding to the first image in the second image are refined by both local and global discriminators. At this stage, the consistency of landmark is emphasized, so the final generation result is realistic and discernible.

It will be appreciated by those skilled in the art that the generative adversarial network may use the face attribute information generated based on the input image as a constraint at the training and application stages. Where the input image may be an input first image sample when the generative adversarial network is trained. The generative adversarial network extracts face attribute information of the input first image sample, and uses the face attribute information as a constraint of the generative adversarial network to obtain the output generated image. In applying the generative adversarial network, the input image may be the input first image. The generative adversarial network extracts face attribute information of the input first image, and uses the face attribute information of the first image as a constraint of the generative adversarial network to obtain the output second image.

The first image inputted to the generative adversarial network may be an image including a face. The second image outputted by the generative adversarial network may be an image of a style or gender different from the first image and including a face.

Specifically, using, by the generative adversarial network, the face attribute information generated based on the input image as a constraint includes: using, by the generative adversarial network, the face key point and/or the face semantic segmentation result generated based on the input image as a constraint.

The executing body may use a face key point extraction technique to extract a face key point of an input image, and use the face key point as a constraint in generating an output image by the generative adversarial network. Alternatively or additionally, the executing body may use the face semantic segmentation result employing a face semantic segmentation technique as a constraint in generating an output image by the generative adversarial network.

With the face key point and/or the face semantic segmentation result generated based on the input image as constraints, it is possible for the generator to associate the five sense organs in the input image with the sense organs in the output image, so that face features are not incorrectly generated at other locations, therefore the input image may be a larger image including a face without being limited to inputting only the face image, and accuracy and quality of the output image are improved.

In some alternative implementations of the present embodiment, inputting the first image into the pre-trained generative adversarial network includes: subjecting the first image to different degrees of Gaussian blurring, and inputting the different degrees of Gaussian blurred first image into the pre-trained generative adversarial network.

In the present implementation, the Gaussian Blur, also known as Gaussian smoothing, can reduce image noise and reduce the level of detail, and enhance the image effect of the image at different scale sizes (reference may be made to scale space representation and scale space implementation). From a mathematical point of view, the Gaussian blurring process of an image is the convolution of the image with the normal distribution. Since the normal distribution is also referred to as Gaussian distribution, this technique is also referred to as Gaussian Blur.

By using the Gaussian blurred first image of different degrees as the input of the generative adversarial network, a second image of different sharpness can be obtained, so that the desired clear second image can be determined on the basis of the second image of different sharpness.

Alternatively or additionally, inputting the first image into a pre-trained generative adversarial network includes: detecting whether a texture feature parameter value of the first image is greater than a texture threshold, and if so, subjecting the first image to different degrees of Gaussian blurring, and inputting the different degrees of Gaussian blurred first image into a pre-trained generative adversarial network.

Here, the texture feature parameter value of the image refers to a parameter value for characterizing the texture feature of the image. For example, the thickness, density, and directivity of the texture. When the texture feature parameter value of the first image is detected to be greater than a texture threshold, it indicates that the texture of the first image is complex. Generally, image content generated based on an image with complex texture is messier. Therefore, different degrees of Gaussian blurring may be performed on the first image, so that a second image is separately generated for different degrees of Gaussian blurred first images, thereby obtaining second images of different sharpness. Thereafter, the desired clear second image may be determined on the basis of the second images of different sharpness, thereby improving the quality of the generated image.

The pre-trained generative adversarial network may use a crawler to crawl image samples from a network or directly acquire image sample data sets, and each of the images includes a face; then, the crawled or acquired image samples may be directly used as the image samples of the training-generative adversarial network. Alternatively, a crawled image including a face is used as an initial image sample, and further data processing is performed on the initial image sample to obtain a screened image that meets the requirements of the image sample, and the screened image is used as an image sample for training the generative adversarial network.

Since the training data need to be consistent in style and contain image samples of different gender, different angles, and different face sizes, the pre-trained generative adversarial network can perform data enhancement on the initial image samples, thereby increasing the amount of training data, improving the generalization capability of the generative adversarial network, and increasing the noise data, thereby improving the robustness of the generative adversarial network. Data enhancement may include operations such as rotation, translation, folding, flipping, scaling, and varying degrees of Gaussian blurring.

In some alternative implementations of the present embodiment, using, by the generative adversarial network, the face attribute information generated based on the input image as a constraint includes: using, by the generative adversarial network, the multi-channel face image generated based on the input image as an input; where the multi-channel face image includes an RGB three-channel image of the input image and at least one of following images of the input image: one of the following two images of the key points of the face: a binary image of one-channel or an RGB three-channel image; one of the following two images of the face semantic segmentation result: a binary image of one-channel or an RGB three-channel image; or a binary image of the hair.

In some specific examples of the present implementation, based on the first image, a face key point image of the first image may be acquired using a technique for extracting a face key point in the prior art or a technique developed in the future, which is not limited in the present disclosure. For example, face key point extraction may be performed by using an active shape model (ASM, Active Shape Model), an active appearance model (AMM, Active Appearance Model,), a cascaded shape regression model (Cascaded Shape Regression, CSR), a face alignment algorithm (DAN, Deep Alignment Network), or the like. Then, the RGB three-channel image of the face key point or the binary image of one-channel of the face key point can be obtained on the basis of the face key point image.

Based on the first image, a face semantic segmentation result of the first image may be obtained by using a semantic segmentation technology in the prior art or a future development technology, which is not limited in the present disclosure. In some specific examples, the technique of segmenting the face semantics may use a fully convolutional neural network (FCN), a semantic segmentation network (SegNet), a Dilated Convolution, a semantic segmentation (DeepLab (v1, v2, V3, etc.)), an image segmentation model (RefineNet), a pyramid scene parsing network (PSPNet), or the like to acquire the face semantic segmentation result of the first image based on the first image. Semantic segmentation is an extension of object detection, the output of which is a color mask by category of the object, which enables a more accurate positioning of the object without being affected by the complex shape of the object. Then, the RGB three-channel image of the face semantic segmentation result or the binary image of the face key point may be obtained on the basis of the face semantic segmentation result.

Based on the first image, a binary image of one-channel of the hair of the first image can be obtained by a technique of a hair segmentation technique in the prior art or a technology developed in the future, which is not limited in the present disclosure. For example, a hair segmentation technique may be used to obtain a hair segmentation result first, and then convert the hair segmentation result into a binary one-channel image of the hair, and each pixel of the hair segmentation result is represented by the binary image of one-channel.

It will be appreciated by those skilled in the art that the multi-channel face image samples employed in the pre-training of the generative adversarial network are adapted to the multi-channel face image input when applying the generative adversarial network so as to obtain the training-completed generative adversarial network suitable for the multi-channel face image input when applying the generative adversarial network.

According to the method for generating a face image in the present embodiment, a multi-channel face image is input into a pre-trained generative adversarial network, and the input image details are more abundant, so that accuracy and quality of a second image output by the pre-trained generative adversarial network can be improved.

In step 204, the second image is presented to the user in response to obtaining the second image output by the generative adversarial network in the backend.

In the present embodiment, the executing body may present the second image output from the pre-trained generative adversarial network to the user.

In a specific example, the first image is a real face image; the second image is a cartoon image. Here, the cartoon image may be a sketch or base map of a mural, an oil painting, a carpet, or the like, and may also be a comic painting, a satirical painting, a humorous painting, or the like.

In some alternative implementations of the present embodiment, the method may further include: presenting the first image and the second image to the user simultaneously after presenting the second image to the user for a predetermined time length.

In the present implementation, the executing body may present the first image and the second image to the user simultaneously after presenting the second image to the user for a predetermined time length. For example, the executing body may display the first image and the second image in the upper left and lower right positions in the screen, respectively. Alternatively, the first image and the second image are displayed in a split screen manner, so that the user can view the first image and the second image in comparison, thereby improving the interaction efficiency.

According to the method for generating an image according to the embodiments of the present disclosure, in the process of generating a second image based on a first image, by using the face attribute information of the first image as a constraint of the generative adversarial network, the quality, accuracy and efficiency of generating the second image based on the input first image by the generative adversarial network can be improved, and the probability of erroneous generation of the image is reduced, so that the generated second image is more targeted.

An example application scenario of a method for generating an image of an embodiment of the present disclosure is described below in conjunction with FIG. 3.

Figure 3:
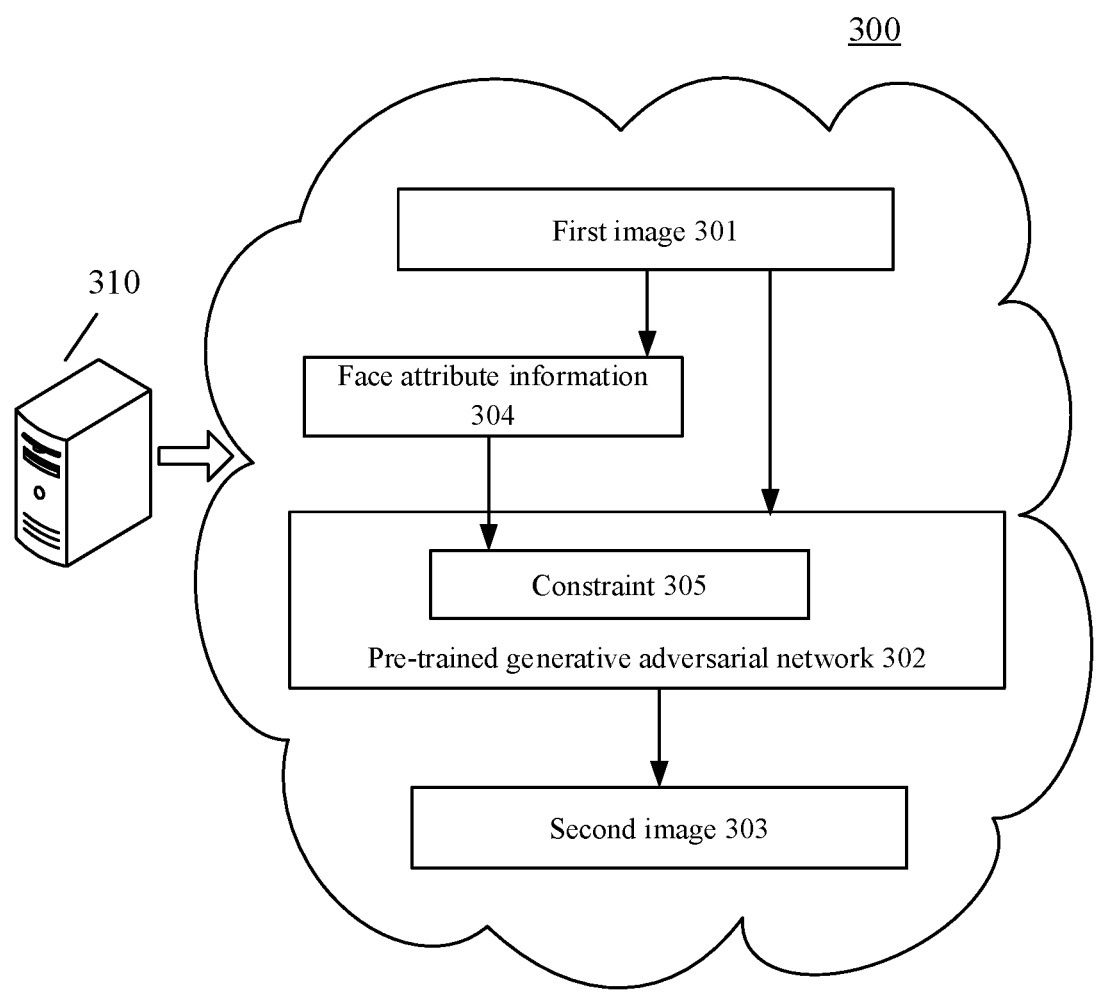
FIG. 3 is an example application scenario of a method for generating an image according to an embodiment of the present disclosure.

As shown in FIG. 3, FIG. 3 illustrates an example application scenario of the method for generating an image according to an embodiment of the present disclosure.

As shown in FIG. 3, the method 300 for generating an image is run in an electronic device 310, and may include the following steps.

First, a first image 301 including a face input by a user is received.

Second, presenting the first image 301 to the user.

Then, the first image 301 is input to a pre-trained generative adversarial network 302 in the backend to obtain a second image 303 output by the generative adversarial network; where the generative adversarial network 302 uses face attribute information 304 generated based on the input image as a constraint 305.

Finally, the second image 303 is presented to the user in response to obtaining the second image 303 output by the generative adversarial network in the backend.

It should be understood that the application scenario of the method for generating an image illustrated in FIG. 3 above is merely an example description of the method for generating an image, and does not represent a limitation on the method. For example, the steps shown in FIG. 3 above may be further implemented in more detail. On the basis of the FIG. 3, other steps for generating an image may be further added.

Figure 4:
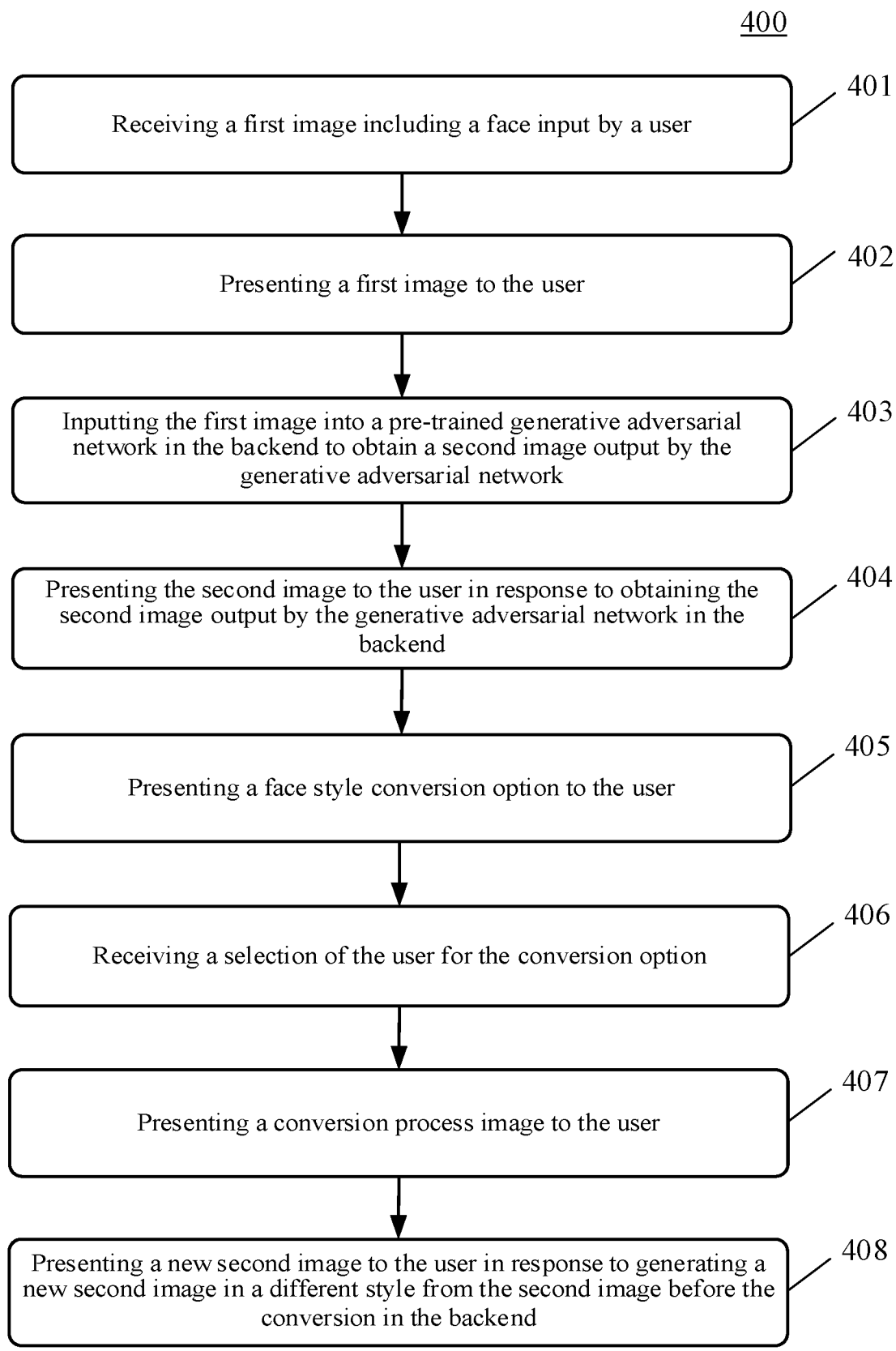
FIG. 4 is a flow diagram of a method for generating an image according to another embodiment of the present disclosure.

Referring further to FIG. 4, there is shown a schematic flow diagram of the method for generating a face image according to another embodiment of the present disclosure.

As shown in FIG. 4, the method 400 for generating a face image according to the present embodiment may include the following steps.

Step 401: receiving a first image including a face input by a user.

In the present embodiment, an executing body of the method for generating an image (such as the terminal or the server shown in FIG. 1) may acquire a first image including a face input by a user from a local or remote album or a database in an interactive scene, or may acquire the first image including a face via a local or remote photographing service.

Step 402, presenting a first image to the user.

In the present embodiment, the executing body of the method for generating an image may present the first image to the user in a presentation manner in the prior art or in the future development technology, which is not limited in the present disclosure. For example, the executing body may present the first image to the user on a display screen, or present the first image to the user using conventional projection techniques or holographic projection techniques.

Step 403, inputting the first image into a pre-trained generative adversarial network in the backend to obtain a second image output by the generative adversarial network.

In the present embodiment, the executing body may input the first image into a pre-trained generative adversarial network in the backend to obtain a second image output by the generative adversarial network; where the generative adversarial network uses face attribute information generated based on the input image as a constraint.

The pre-trained generative adversarial network refers to a deep learning model developed on the basis of GANs (Generative Adversarial Networks). For example, the generative adversarial network (GAN), the cyclic consistently generative adversarial network CycleGan, the face high-precision attribute editing model AttGAN, the star generative adversarial network StarGAN, the space transformer generative adversarial network STGAN, the dual learning generative adversarial networks DualGAN, DiscoGAN, and the like.

Step 404: presenting the second image to the user in response to obtaining the second image output by the generative adversarial network in the backend.

In the present embodiment, the executing body may present the second image output by the pre-trained generative adversarial network to the user.

In a specific example, the first image is a real face image; and the second image is a cartoon image. Here, the cartoon image may be a sketch or base map of a mural, an oil painting, a carpet, or the like, and may also be a comic painting, a satirical painting, a humorous painting, or the like.

It will be appreciated by those skilled in the art that steps 401 to 404 described above correspond to steps 201 to 204 in the embodiment shown in FIG. 2. Thus, the operations and features described above for steps 201 to 204 in the embodiment shown in FIG. 2 also apply to steps 401 to 404, and details are not described herein.

Step 405: presenting a face style conversion option to the user.

In the present implementation, the executing body may present the face style conversion option to the user when presenting the second image to the user or after presenting the second image to the user, so that the user selects the style conversion option, thereby converting the style of the generated second image. For example, the user may be presented with a scroll wheel of a style conversion option that can be rotated so that the user rotates the scroll wheel and selects a style that the user likes.

In some alternative implementations of the present embodiment, presenting a face style conversion option to a user may include: presenting an image of a dice button and an image of a dynamic clicked hand to the user. This can direct the receiving user to click on the dice button for face style conversion.

Step 406: receiving a selection of the user for the conversion option.

In the present embodiment, receiving a selection of the user for the conversion option, that is, the executing body receives the selection of the user for the conversion option.

Step 407: presenting a conversion process image to the user.

In the present embodiment, after receiving the selection of the conversion option by the user, the executing body generates a new second image having a different style from the second image before the conversion in the backend, and presents the conversion process image to the user. The conversion process image herein refers to an image in which the conversion process can be embodied, for example, a conversion progress bar, a dynamic conversion image, or the like.

When generating a second image different from the second image generated last time in the backend, a new second image of a different style may be obtained by modifying part of the content of the first image. For example, parameters such as brightness and contrast of the background of the first image may be modified, and the modified first image is input to a pre-trained generative adversarial network to obtain a new second image.

In some alternative implementations of the present embodiment, after the image of the dice button and the dynamic clicked hand is presented to the user, the user may click the dice button, and the executing body may present the dynamic dice image to the user. In this way, the user can be intuitively guided to click the dice to change the face style, and the interaction process after clicking the dice can be intuitively presented to the user, thereby improving the efficiency of the human-computer interaction.

Step 408: presenting a new second image to the user in response to generating a new second image in a different style from the second image before the conversion in the backend.

In the present embodiment, if the executing body generates the converted-style second image in the backend, the converted-style second image may be used as the new second image, and the new second image may be presented to the user.

In presenting the new second image to the user, some special effects may be employed to present the new second image. For example, a new second image may be presented to a user with a downward erasing special effect, a dot-like blanking special effect, a rotation blanking special effect, or the like, so as to intuitively reflect a conversion process of the second image.

In some alternative implementations of the present embodiment, the method for generating a face image further includes: returning to presenting the information of inputting face image to the user in response to not receiving a selection operation on a saving option or a conversion option by the user within a predetermined time length after presenting the conversion option.

In the present embodiment, if not receiving a selection operation on a saving option or a conversion option by the user within a predetermined time length after presenting the conversion option, it indicates that the user is not satisfied with the current second image and does not want to convert the style based on the previous first image again, and at this time the executing body returns to presenting the information of inputting face image to the user. In this way, the executing body can remind the user to input a new first image including a face without the operation of the user, so as to generate a face image next time, thereby improving intelligence and human-computer interaction efficiency of the method for generating a face image.

In some alternative implementations of the present embodiment, the executing body inputs the first image into the pre-trained generative adversarial network located at the cloud server in the backend to obtain the second image output by the generative adversarial network in response to detecting a network abnormality when inputting the first image to the pre-trained generative adversarial network located at the cloud server in the backend, presenting information indicating the network abnormality and requesting retry to the user, and returning to presenting information of inputting input the face image to the user after presenting the information indicating the network abnormality and requesting retry for a preset duration.

In the present implementation manner, when the network is abnormal, the executing body may remind the user that the network is abnormal and please try again, and after a preset time interval, return to presenting information of inputting input the face image to the user again. Thus, the user may be reminded to input a new first image including the face image without the operation of the user, so as to perform the next generating of the face image, thereby improving intelligence and human-computer interaction efficiency of the method for generating a face image.

In some alternative implementations of the present embodiment, the method for generating a face image further includes at least one of: in response to inputting the first image into the pre-trained generative adversarial network in the backend to obtain the second image output by the generative adversarial network for a time length exceeding a preset time length, presenting to the user information indicating failure of generating and retry being requested; in response to an abnormality occurring in a process of inputting the first image into the pre-trained generative adversarial network in the backend to obtain the second image output by the generative adversarial network, presenting information indicating failure of generating and retry being requested to the user; or in response to the user switching to another application and returning from the application, returning to presenting the information of inputting the face image to the user.

In the present embodiment, when the time length for generating the second image exceeds the preset time length, or an abnormality occurs in the process of generating the second image, the executing body presents information indicating failure of generating and retry being requested to the user, and returns presenting the information of inputting the face image to the user when the time length of presenting to the user information indicating failure of generating and retry being requested meets a set time length. In this way, the user can be intuitively prompted to retry, thereby improving interaction efficiency.

In addition, when the user switches to another application and returns from the another application, the executing body returns to presenting the information of inputting the face image to the user, so that the user can be reminded to input a new first image including the face without the operation of the user, so as to perform the next generating of the face image, thereby improving intelligence and human-computer interaction efficiency of the method for generating the face image.

Compared with the method in the embodiment shown in FIG. 2, the method for generating an image in the embodiment of the present disclosure can present a face to a user, present a face style conversion option to the user on the basis of the embodiment shown in FIG. 2, then receive a selection of the user for the conversion option, then present a conversion process image to the user, and finally present a new second image to the user in response to generating a new second image with a different style from the second image in the backend, so that when the user is not satisfied with the generated two-dimension image, a second two-dimension image can be re-generated by clicking a button without re-photographing. One original image can generate different types of two-dimension images, thereby improving the efficiency of generating a second image that meets the needs of the user.

As an implementation of the method shown in each of the above figures, an embodiment of the disclosure provides an apparatus for generating an image, which corresponds to the method embodiment shown in FIGS. 2-4, and which is specifically applicable to the terminal or server shown in FIG. 1.

Figure 5:
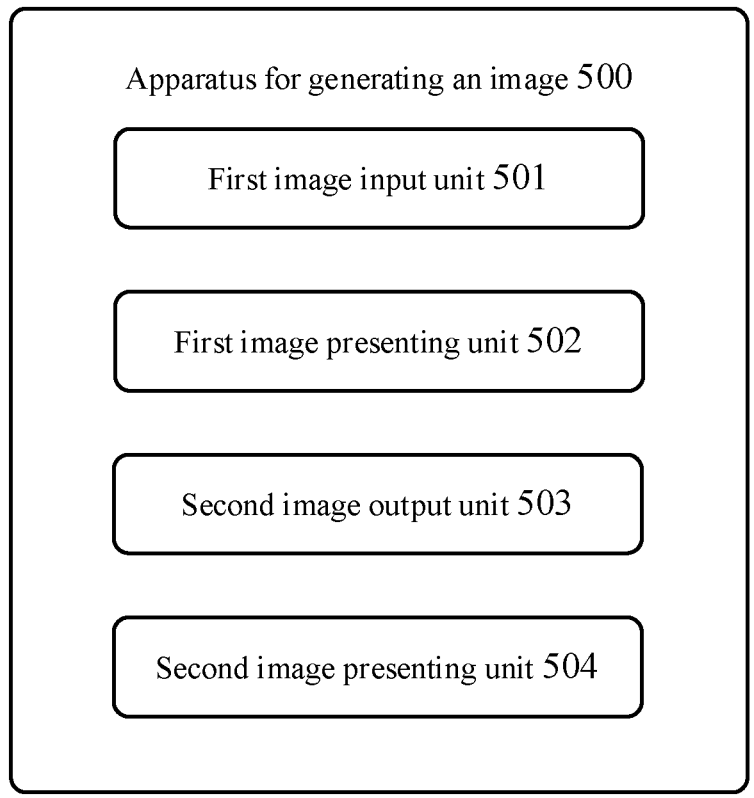
FIG. 5 is an example structural diagram of an apparatus for generating an image according to an embodiment of the present disclosure.

As shown in FIG. 5, the apparatus 500 for generating an image according to the present embodiment may include: a first image input unit 501 configured to receive a first image including a face input by a user; a first image presenting unit 502 configured to present the first image to the user; a second image output unit 503 configured to input the first image into a pre-trained generative adversarial network in the backend to obtain a second image output by the generative adversarial network; where the generative adversarial network uses face attribute information generated based on the input image as a constraint; and the second image presenting unit 504 configured to present the second image to the user in response to obtaining the second image output by the generative adversarial network in the backend.

In some embodiments, the apparatus further includes (not shown in the figure) an indication receiving unit configured to receive an instruction of converting a face in an interactive scene; and an information presenting unit configured to present information of inputting the face image to the user.

In some embodiments, the presenting information of the inputting the face image to the user includes: presenting a face automatic photographing interface to the user; and receiving the first image including the face input by the user includes: triggering an automatic photographing function to obtain the first image in response to detecting that the user inputs the face at the automatic photographing interface.

In some embodiments, presenting the face automatic photographing interface to the user comprises at least one of: presenting an automatic photographing interface having a frame of a preset style and/or photographing requirements to the user; or presenting prompt information of failure to detect the face to the user in response to failing to detect the face at the photographing interface.

In some embodiments, the presenting the face automatic photographing interface to the user further includes: presenting an automatic photographing countdown to the user in response to detecting a face at the photographing interface; photographing the detected face in response to the end of the automatic photographing countdown; and ending the countdown and presenting prompt information indicating that the face is not recognized to the user in response to the user not inputting the face within the automatic photographing countdown period.

In some embodiments, the first image presenting unit is further configured to: after presenting the first image to the user for a preset time length, provide a masking layer on the presented first image and display face conversion progress prompt information in the interactive scene.

In some embodiments, the frame of the preset style is the same as or similar to a design style of the face conversion progress prompt information.

In some embodiments, the second image output unit is further configured to: subject the first image to different degrees of Gaussian blurring, and input the different degrees of Gaussian blurred first image into a pre-trained generative adversarial network; or detecting whether a texture feature parameter value of the first image is greater than a texture threshold, subject the first image to different degrees of Gaussian blurring in response to the texture feature parameter value of the first image being greater than the texture threshold, and input the different degrees of Gaussian blurred first image into a pre-trained generative adversarial network.

In some embodiments, the generative adversarial network employed in the second image output unit using face attribute information generated based on the input image as a constraint, including: using, by the generative adversarial network, multi-channel face image generated based on the input image as an input; wherein the multi-channel face image comprises an RGB three-channel image of the input image and at least one of following images of the input image: one of the following two images of key points of the face: a binary image of one-channel or an RGB three-channel image; one of the following two images of a face semantic segmentation result: a binary image of one-channel or an RGB three-channel image; or a binary image of hair.

In some embodiments, the apparatus further includes an image simultaneous presenting unit (not shown in the figure) configured to simultaneously present the first image and the second image to the user after presenting the second image to the user for a predetermined time length.

In some embodiments, the apparatus further includes a conversion option presenting unit (not shown in the figure) configured to present a face style conversion option to the user; a user selection receiving unit configured to receive a selection of the user for the conversion option; a process image presenting unit configured to present a converted process image to a user; and a second image updating unit configured to present a new second image to the user in response to generating the new second image in a different style from the second image before a conversion in the backend.

In some embodiments, the conversion option presenting unit is further configured to present an image of the dice button and an image of dynamic clicked hand to the user; the user selection receiving unit is further configured to receive a user click on the dice button; and the process image presenting unit is further configured to present a dynamic dice image to the user.

In some embodiments, the second image updating unit is further configured to present the new second image to the user with a downward erasing special effect.

In some embodiments, the apparatus further includes an information presentation return unit (not shown in the figure) configured to: return to presenting the information of inputting face image to the user in response to not receiving a selection operation on a saving option or a conversion option by the user within a predetermined time length after presenting the conversion option.

In some embodiments, the inputting the first image into the pre-trained generative adversarial network in the backend to obtain the second image output by the generative adversarial network includes: inputting the first image into the pre-trained generative adversarial network located at the cloud server in the backend to obtain the second image output by the generative adversarial network; and the apparatus further includes an information presentation returning unit configured to: in response to detecting a network abnormality when inputting the first image to the pre-trained generative adversarial network located at the cloud server in the backend, present information indicating the network abnormality and requesting retry to the user, and return to presenting information of inputting input the face image to the user after presenting the information indicating the network abnormality and requesting retry for a preset duration.

In some embodiments, the information presentation returning unit is further configured to: in response to inputting the first image into the pre-trained generative adversarial network in the backend to obtain the second image output by the generative adversarial network for a time length exceeding a preset time length, present to the user information indicating failure of generating and retry being requested, and when a time length of presenting to the user information indicating failure of generating and retry being requested meets a set time length, return to presenting the information of inputting the face image to the user; in response to an abnormality occurring in a process of inputting the first image into the pre-trained generative adversarial network in the backend to obtain the second image output by the generative adversarial network, present information indicating failure of generating and retry being requested to the user, and return to presenting the information of inputting the face image to the user when a duration of presenting the information indicating failure of generating and retry being requested to the user meets a set duration; or in response to the user switching to another application and returning from the another application, return to presenting the information of inputting the face image to the user.

It should be understood that the units described in the apparatus 500 correspond to the steps described in the method described with reference to FIGS. 2-4. Thus, the operations and features described above with respect to the method are equally applicable to the apparatus 500 and the various units contained therein, and details are not described herein.

Figure 6:
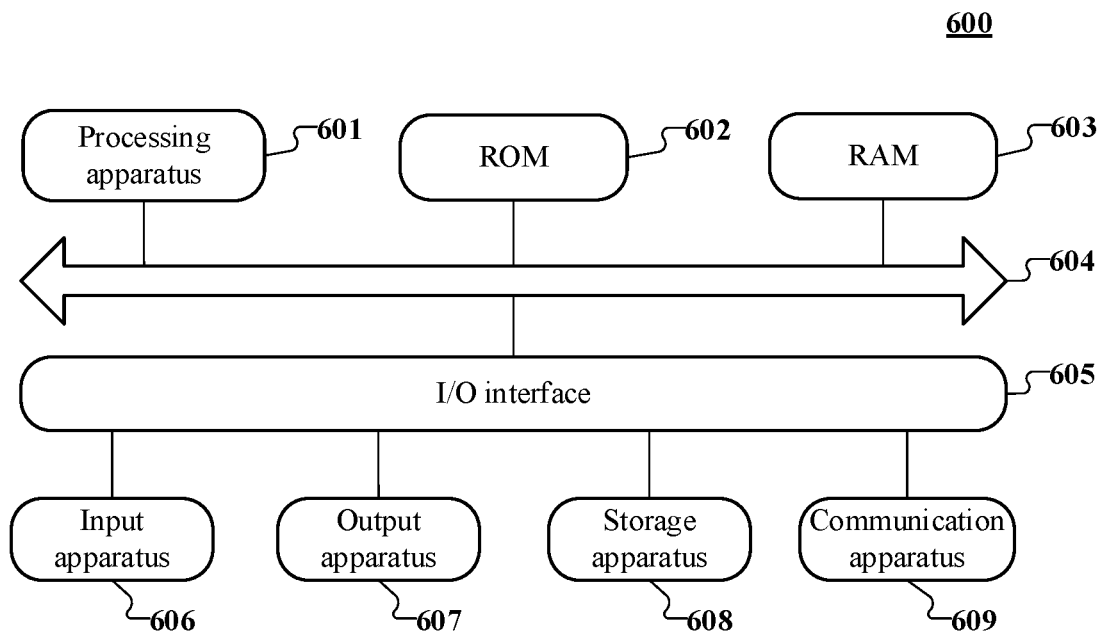
FIG. 6 is a schematic structural diagram of a computer system suitable for implementing a server of some embodiments of the present disclosure.

Referring now to FIG. 6, there is shown a schematic structural diagram of an electronic device (e.g., the server or terminal device in FIG. 1) 600 suitable for implementing some embodiments of the present disclosure. The terminal device in embodiments of the present disclosure may include, but are not limited to, such as a notebook computer, a desktop computer, and the like. The terminal device/server shown in FIG. 6 is merely an example and should not be construed as limiting the functionality and scope of use of the embodiments of the present disclosure.

As shown in FIG. 6, the electronic device 600 includes a processing apparatus (such as a Central Processing Unit, a Graphics Processing Unit, or the like) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The CPU 601, the ROM 602 and the RAM 603 are connected to each other through a bus 604. An input/output (I/O) interface 605 is also connected to the bus 604.

The following components are connected to the I/O interface 605: an input apparatus 606 including a keyboard, a mouse, a camera, a microphone, an accelerometer, a gyroscope, and the like; an output apparatus 607 including a c liquid crystal display device (LCD), a speaker, a vibrator, and the like; a storage apparatus 608 including a tape, a hard disk and the like; and a communication apparatus 609 including a network interface card such as a LAN (local area network) card and a modem. The communication portion 609 performs communication processes via a network such as the Internet. Although FIG. 6 shows an electronic device 600 having various apparatus, it should be understood that it is not required to implement or have all the apparatus shown. More or fewer apparatus may be implemented or provided instead. Each block shown in FIG. 6 can represent one apparatus or multiple apparatus as needed.

In particular, according to embodiments of the present disclosure, the process described above with reference to the flow chart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, and/or may be installed from the storage apparatus 608, or may be installed from the ROM 602. The computer program, when executed by the processing apparatus 601, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

The computer-readable medium may be included in the electronic device; or may exist alone without being assembled into the electronic device. The computer-readable medium carries one or more programs, and the one or more programs when executed by the electronic device, cause the electronic device to: receive a first image including a face input by a user; present the first image to the user; input the first image into a pre-trained generative adversarial network in the backend to obtain a second image output by the generative adversarial network; where the generative adversarial network uses face attribute information generated based on the input image as a constraint; and present the second image to the user in response to obtaining the second image output by the generative adversarial network in the backend.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first image input unit, a first image presenting unit, a second image output unit, and a second image presenting unit. Here, the names of these units do not in some cases constitute a limitation to such units themselves. For example, the generating unit may also be described as "a unit configured to receive a first image including a face input by a user."

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a face image, comprising:
   receiving a first image including a face input by a user;
   presenting the first image to the user;
   subjecting the first image to different degrees of Gaussian blurring, and inputting the different degrees of Gaussian blurred first image into a pre-trained generative adversarial network in a backend to obtain a second image output by the generative adversarial network; wherein the generative adversarial network uses face attribute information generated based on the input image as a constraint; and
   presenting the second image to the user in response to obtaining the second image output by the generative adversarial network in the backend.

2. The method of claim 1, wherein before receiving the first image including the face input by the user, the method further comprises: receiving an instruction of converting a face in an interactive scene; and
   presenting information of inputting the face image to the user.

3. The method of claim 2, wherein presenting information of inputting the face image to the user comprises: presenting a face automatic photographing interface to the user; and
   the receiving the first image including the face input by the user comprises: triggering an automatic photographing function to obtain the first image in response to detecting that the user inputs the face in an automatic photographing interface.

4. The method of claim 3, wherein the presenting the face automatic photographing interface to the user comprises at least one of:
   presenting an automatic photographing interface having a frame of a preset style and/or photographing requirements to the user; or
   presenting prompt information of failure to detect the face to the user in response to failing to detect the face at the photographing interface.

5. The method of claim 3, wherein the presenting the face automatic photographing interface to the user further comprises:
   presenting an automatic photographing countdown to the user in response to detecting the face at the automatic photographing interface;
   photographing the detected face in response to an end of the automatic photographing countdown; and
   ending the countdown and presenting prompt information indicating that the face is not recognized to the user in response to the user not inputting the face within an automatic photographing countdown period.

6. The method of claim 4, wherein the presenting the first image to the user comprises: after presenting the first image to the user for a preset time length, providing a masking layer on the presented first image and displaying face conversion progress prompt information in an interactive scene.

7. The method of claim 6, wherein the frame of the preset style is the same as or similar to a design style of the face conversion progress prompt information.

8. The method of claim 1, wherein the method further comprises:
before subjecting the first image to different degrees of Gaussian blurring, detecting whether a texture feature parameter value of the first image is greater than a texture threshold, and subjecting the first image to different degrees of Gaussian blurring in response to the texture feature parameter value of the first image being greater than the texture threshold.

9. The method of claim 1, wherein the generative adversarial network using face attribute information generated based on the input image as the constraint comprising: using, by the generative adversarial network, multi-channel face image generated based on the input image as an input; wherein the multi-channel face image comprises an RGB three-channel image of the input image and at least one of following images of the input image:
one of the following two images of key points of the face:
a binary image of one-channel or an RGB three-channel image;
one of the following two images of a face semantic segmentation result: a binary image of one-channel or an RGB three-channel image; or
a binary image of hair.

10. The method of claim 1, wherein the method further comprises:
presenting the first image and the second image to the user simultaneously after presenting the second image to the user for a predetermined time length.

11. The method of claim 2, wherein the method further comprises:
presenting a face style conversion option to the user;
receiving a selection of the user for the conversion option;
presenting a conversion process image to the user; and
presenting a new second image to the user in response to generating the new second image in a different style from the second image before a conversion in the backend.

12. The method of claim 11, wherein the presenting the face style conversion option to the user comprises: presenting an image of a dice button and an image of a dynamically clicked hand to the user;
the receiving the selection of the user for the conversion option comprises: receiving a user click of the dice button; and
the presenting the conversion process image to the user comprises: presenting a dynamic dice image to the user.

13. The method of claim 11, wherein presenting the new second image to the user comprises: presenting the new second image to the user with a downward erasing special effect.

14. The method of claim 11, wherein the method further comprises:
returning to presenting the information of inputting face image to the user in response to not receiving a selection operation on a saving option or a conversion option by the user within a predetermined time length after presenting the conversion option.

15. The method of claim 1, wherein the inputting the first image into the pre-trained generative adversarial network in the backend to obtain the second image output by the generative adversarial network comprises: inputting the first image into the pre-trained generative adversarial network located at a cloud server in the backend to obtain the second image output by the generative adversarial network output; and the method further comprises:
in response to detecting a network abnormality when inputting the first image to the pre-trained generative adversarial network located at the cloud server in the backend, presenting information indicating the network abnormality and requesting retry to the user, and returning to presenting information of inputting input the face image to the user after presenting the information indicating the network abnormality and requesting retry for a preset duration.

16. The method of claim 1, wherein the method further comprises at least one of:
in response to inputting the first image into the pre-trained generative adversarial network in the backend to obtain the second image output by the generative adversarial network for a time length exceeding a preset time length, presenting to the user information indicating failure of generating and retry being requested, and when a time length of presenting to the user information indicating failure of generating and retry being requested meets a set time length, returning to presenting the information of inputting the face image to the user;
in response to an abnormality occurring in a process of inputting the first image into the pre-trained generative adversarial network in the backend to obtain the second image output by the generative adversarial network, presenting information indicating failure of generating and retry being requested to the user, and returning to presenting the information of inputting the face image to the user when a duration of presenting the information indicating failure of generating and retry being requested to the user meets a set duration; or
in response to the user switching to another application and returning from the another application, returning to presenting the information of inputting the face image to the user.

17. An electronic device, comprising:
one or more processors; and
a storage apparatus configured to store one or more programs;
wherein the one or more programs, when executed by the one or more processors, cause the one or more processors to perform operations, the operations comprising:
receiving a first image including a face input by a user;
presenting the first image to the user;
subjecting the first image to different degrees of Gaussian blurring, and inputting the different degrees of Gaussian blurred first image into a pre-trained generative adversarial network in a backend to obtain a second image output by the generative adversarial network; wherein the generative adversarial network uses face attribute information generated based on the input image as a constraint; and
presenting the second image to the user in response to obtaining the second image output by the generative adversarial network in the backend.

18. The electronic device of claim 17, wherein the presenting the first image to the user comprises: after presenting the first image to the user for a preset time length, providing a masking layer on the presented first image and displaying face change progress prompt information in an interactive scene.

19. The electronic device of claim 17, wherein the inputting the first image into the pre-trained generative adversarial network comprises:

subjecting the first image to different degrees of Gaussian blurring, and inputting the different degrees of Gaussian blurred first image into a pre-trained generative adversarial network; or detecting whether a texture feature parameter value of the first image is greater than a texture threshold, subjecting the first image to different degrees of Gaussian blurring in response to the texture feature parameter value of the first image being greater than the texture threshold, and inputting the different degrees of Gaussian blurred first image into the pre-trained generative adversarial network.

20. A non-transitory computer readable medium, storing a computer program thereon, wherein the program, when executed by a processor, causes the processor to perform operations, the operations comprising:

receiving a first image including a face input by a user;

presenting the first image to the user;

subjecting the first image to different degrees of Gaussian blurring, and inputting the different degrees of Gaussian blurred first image into a pre-trained generative adversarial network in a backend to obtain a second image output by the generative adversarial network; wherein the generative adversarial network uses face attribute information generated based on the input image as a constraint; and presenting the second image to the user in response to obtaining the second image output by the generative adversarial network in the backend.

* * * * *